Aug. 25, 1942.  L. B. ROOT  2,293,852
CURRENT-CONDUCTING ASSEMBLAGE FOR MOTOR VEHICLES
Filed Jan. 22, 1940  2 Sheets-Sheet 1
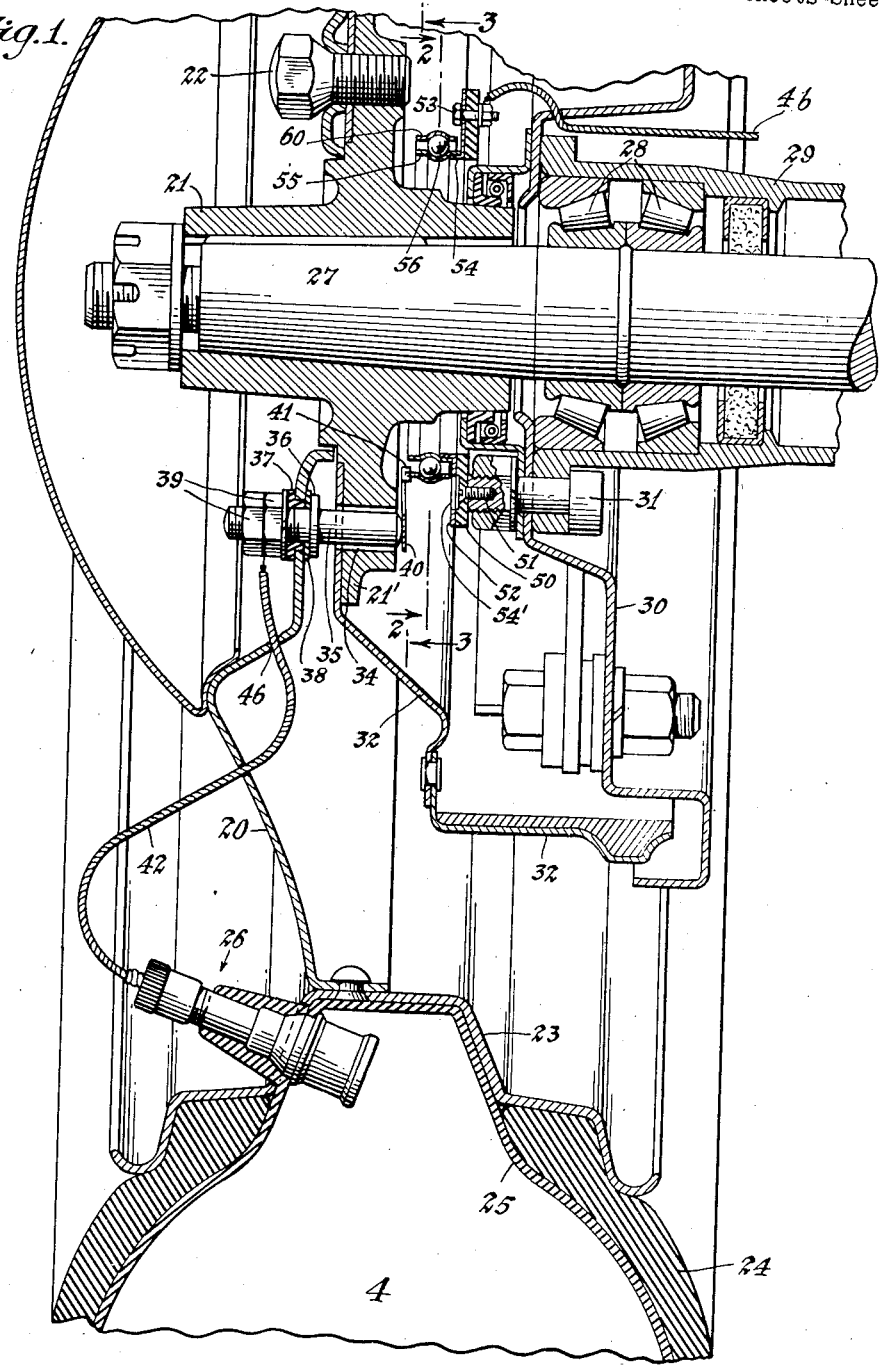
INVENTOR:
Lynott B. Root,
BY
His ATTORNEY.

Aug. 25, 1942.   L. B. ROOT   2,293,852
CURRENT-CONDUCTING ASSEMBLAGE FOR MOTOR VEHICLES
Filed Jan. 22, 1940   2 Sheets-Sheet 2
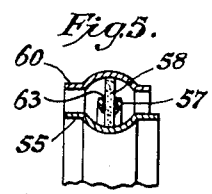
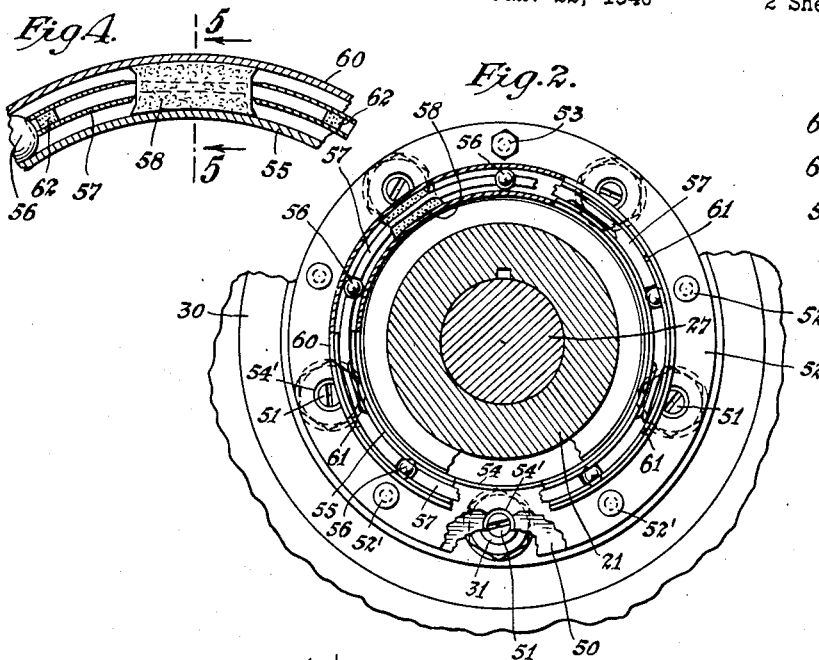
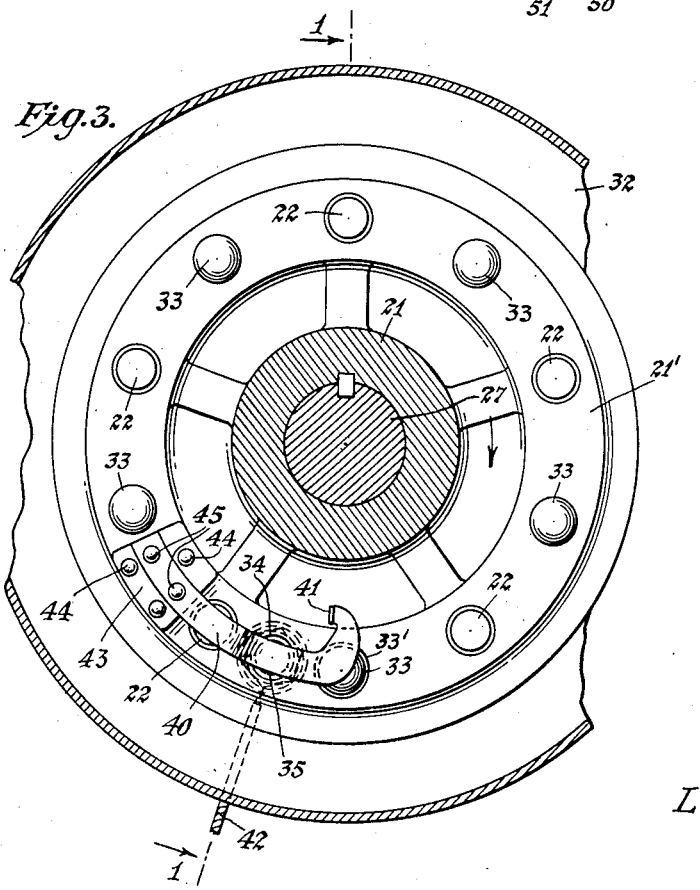
INVENTOR:
Lynott B. Root,
BY
*his* ATTORNEY.

Patented Aug. 25, 1942

2,293,852

UNITED STATES PATENT OFFICE 2,293,852

CURRENT-CONDUCTING ASSEMBLAGE FOR MOTOR VEHICLES

Lynott B. Root, Reno, Nev.

Application January 22, 1940, Serial No. 315,129

7 Claims. (Cl. 173—324)

This invention relates to an electric protective system for the pneumatic tires of vehicles such as automobiles, railway cars, air planes and the like with a view to preventing the undue deflation thereof and has for its principal objects the provision of an efficient current-conducting assemblage for electrically bridging the gaps between each wheel, while rotating, and the chassis of the vehicle body whereby, upon deflation of the tire below a fixed minimum, an electric circuit which is controlled by a pneumatically operated switch carried on the wheel and associated with the valve stem of its tire can be established through an electric signal on the vehicle body.

My investigations have led to the discovery that a loadless anti-friction bearing having inner and outer raceways and a plurality of individual rolling elements interposed therebetween, such for example as a ball bearing or roller bearing, is ideally adapted for conducting a current across the gap between a rotating vehicle wheel and the chassis of a vehicle, the same being highly efficient and remarkably durable, in fact, the life of the same is even greater than that of the roller bearing ordinarily interposed between the front wheels and their axles. Furthermore, it is possible to substantially completely enclose such bearings within the brake drum so that the same are protected against mud and muddy water and other objectionable fouling substances which might otherwise be splashed or blown thereon while the vehicle is travelling over a pavement or country road.

Heretofore, as I am well aware, it has been proposed to electrically bridge the gap between the wheel of an automobile and the car body by either providing an insulated load-carrying main bearing, all as set forth in Patent No. 2,063,452, or else by the provision of a supplemental loadless insulated bearing for such purpose and accordingly no claim is made herein which is of a scope to cover such prior disclosures.

In the following description and drawings forming a part thereof, I have disclosed a preferred embodiment of my invention, in which Figure 1 designates a vertical fragmentary section, taken on the line 1—1 of Fig. 3, of an automobile wheel equipped with a pneumatic tire and adjacent portions of the vehicle body chassis, the same showing my improved current-conducting assemblage interposed in the circuit of the tire pressure indicator for such tire;

Fig. 2 is a fragmentary vertical section, partly broken away, taken on the line 2—2 of Fig. 1;

Fig. 3 is a fragmentary vertical section taken on the line 3—3 of Fig. 1;

Fig. 4 is a fragmentary vertical section of the loadless anti-friction bearing of the circuit current-conducting assemblage;

Fig. 5 is a vertical section taken on the line 5—5 of Fig. 4.

Referring to the drawings and the construction shown therein, the reference numeral 20 designates a demountable wheel, having a hub 21, hub flange 21', wheel bolts 22 and drop center rim 23, that is equipped with a pneumatic tire comprising the shoe 24 and inner tube 25 which latter is provided with a valve stem 26 which is generally of the type illustrated in the patent to Edgeworth Greene, No. 1,975,639, wherein a metal bellows serves as a movable contact element of a pneumatic switch, except that in the construction herein illustrated the insulated conductor 42 that serves to conduct current to the valve stem 26 enters the same from the end thereof rather than laterally as in the construction illustrated in said patent. The outer axle 27 is mounted in the customary manner in a roller bearing interposed between the axle and the stationary axle-housing or axle tube 29. A conventional brake support plate is secured by bolts 31 to the flanged end of the axle housing and a conventional brake drum 32 is secured by means of rivets 33 to the wheel hub flange 21'. Said flange is counter-bored as indicated by the reference numeral 33' to admit of the rivet inserted therein being countersunk for the reason hereinafter specified. An aperture 34 is formed in hub flange 21' for the reception of a pilot contact pin 35 which has an intermediate shoulder or flange 36 formed thereon. Said pin projects through an insulation bushing 37, which is fitted into an aperture in the web 20 that is in register with the aforesaid aperture 34, and serves to insulate said pin from the web 20 and the wheel hub 21 supported thereby. An insulation washer 38 is interposed between said flange 36 and the web 20 to insulate the same from each other and locking nuts 39 serve to rigidly secure said pin 35 on the web 20 and in spaced relation to the wall of aperture 34 through which it projects.

A spring-metal latch contact and drive member 40 having a terminal, laterally offset lug 41 is adapted to be urged inwardly by the end of the pilot pin 35 which permanently engages the same. An insulated conductor 42 having a metal armor, serves to conduct current from the pilot pin 35 to one element of the said pneumatic switch of the valve stem 26. An insulation block 43 is secured by rivets 44 to the flange 21', said block serving as a support for the member 40 which is secured thereto by the rivets 45. The web 20 is pinched with a punch, as indicated by the numeral 46, to insure good metal-to-metal contact between the web and said metal armor which latter is also grounded to the external shell of the valve stem.

An insulation ring 50 is firmly secured by tap screws 51 to the ends of the bolts 31, which are tapped to receive the same, and a metal support ring 52 is secured by rivets 52' to said insulation ring. A binding post 53 serves to connect a wheel wire, such for example as the insulated conductor 4b, to said metal support 52.

The aforesaid loadless, anti-friction bearing constitutes a complete unitary assemblage, in itself, which remains on its support intact, without the respective raceways thereof being split apart from each other, when the wheel is removed from its axle. Such assemblage comprises a stationary inner metal raceway 55, which is of a diameter to tightly engage and be rigidly held by the flange 54 of the ring 52 over which it is sprung (see Fig. 2), and which raceway has a central groove of arcuate cross-section of a radius generally corresponding to that of balls 56 which, in the assembled bearing, are retained in said grooves and adapted to freely roll therealong.

Tubular separators 57 are interposed between each two adjacent balls, the same also serving as a support for gland packing strips or wicks 58.

A cooperating outer movable raceway 60 is so assembled in the well known manner with the other stationary raceway 55 and the balls 56 and their separators 57, as to constitute a complete unitary assemblage as aforesaid. Said raceway 60 is of identical configuration with raceway 55 but of sufficiently greater diameter than such latter raceway to admit of its smooth but entirely free or substantially frictionless rotation with respect to both the inner raceway and the balls 56 which are rotatably supported by the similar opposing grooves of arcuate cross-section formed on the opposing surfaces of the two raceways. The outer raceway 60 has peripheral notches 61 formed thereon which when the wheel is properly mounted on its axle, engage the said ear 41 on the spring-metal drive member 40 and cooperate to freely rotate the raceway relative to the inner raceway 55 during rotation of the adjacent vehicle wheel.

The ends of the separator 57 are plugged with wads 62 of oil-permeable felt or the like and preferably these plugs are positioned at the extreme ends of the tubular separators so as to have wiping engagement with said balls though this is not essential as, if adequately permeable, enough oil will seep therethrough to properly lubricate such balls. As shown, the separators 57 are provided with opposing slots 63 to admit of the wick members 58 penetrating therethrough and having wiping engagement with the grooves on the respective raceways.

The operation of my improved assemblage as is apparent from the foregoing is as follows:

When the air pressure in the tire drops below a predetermined optimum and the aforesaid pneumatic switch in the valve stem is closed in the manner generally described in said Patent No. 1,975,639, the electric circuit is closed through the internal wire of the conductor 42, the pilot pin 35 connected thereto, the drive member 40, outer raceway 60 and thence through the balls 56 and inner raceway 55 to the binding post 53 and wheel wire 4b to the said electric signal of the vehicle body (not shown).

The recess 33' admits of the rivet 33 positioned therein being countersunk to clear the insulated drive member 40 so as to insure the latter will not be grounded.

Various modifications within the scope of the appended claims may be made without departing from the spirit of my invention.

Having thus described my invention, what I claim and desire to obtain by United States Letters Patent is:

1. In a current-conducting assemblage for vehicles, the combination with a vehicle body including its supporting frame, of a vehicle axle having a wheel equipped with a pneumatic tire mounted thereon, said wheel having a metal hub portion, an anti-friction, load-carrying bearing, having two opposing raceways and interposed individual rolling elements, enveloping the axle and being positioned to take the vehicle load and also being in electrical contact with said axle and said hub, a second, substantially loadless, anti-friction bearing, having opposing raceways and individual rolling elements interposed therebetween, said latter bearing being mounted on the frame of the vehicle and being electrically insulated therefrom and being relieved of said vehicle load, one of the raceways thereof being in electrical contact with the wheel hub, and means, carried by said wheel for positively driving one of said raceways of said second bearing in synchronism with the rotation of the wheel, such means being readily separable from such raceway when it is desired to remove the wheel from the body.

2. In a current-conducting assemblage for vehicles, the combination with a vehicle body including its supporting frame, of an axle carried thereby, a tubular housing enveloping said axle, a vehicle wheel equipped with a pneumatic tire having a metal hub mounted on said axle, an anti-friction bearing, having two opposing raceways and interposed individual rolling elements, mounted within said housing and enveloping said axle, said bearing being positioned to take the share of the vehicle load distributed through said axle and said bearing being in electrical contact with the metal hub of the wheel, a second, relatively loadless, anti-friction bearing having opposing raceways and interposed individual rolling elements, said latter bearing being supported independently of said axle and its housing so as to be relieved of the vehicle load, the raceways of the second bearing being in permanent electrical contact with the metal hub of the wheel while being electrically insulated from said axle and the load-carrying bearing and said raceways being positioned beyond the end of the outer end of said axle housing; and an insulated electrical conductor in conductive relation to the raceways of the second bearing and insulated relative to the raceways of the first bearing and said axle and elastic driving means separably united to one of the raceways of the second bearing in such a manner as to prevent relative slippage therebetween during rotation of said wheel.

3. In a current-conducting assemblage for vehicles, the combination with the axle of a vehicle and a wheel equipped with a pneumatic tire mounted thereon, which wheel has a metal hub that is electrically grounded through said axle to said frame, of an anti-friction bearing enveloping said axle and adapted to take the proportionate share of the vehicle load distributed to said axle, said bearing having two opposing raceways and interposed individual rolling elements and said bearing being in electrical contact with said axle, a second bearing insulated from said frame and ground circuit, said bearing having opposing raceways and individual rolling elements interposed therebetween, and being carried by the vehicle body in such a manner as to be relieved of the vehicle load and having an insulated electrical conductor electrically connected thereto and means carried by the vehicle wheel normally engaging and serving to positively drive one of said raceways while being readily disengageable therefrom to permit of the removal of such wheel from the vehicle.

4. In a current-conducting assemblage for vehicles, the sub-combination comprising a body frame, a supporting axle carried thereby, a wheel rotatably mounted on said axle, said wheel having a metallic hub that is electrically grounded through said axle to said frame and being equipped with a pneumatic tire, a load-carrying main bearing enveloping said axle, a unitary, substantially loadless, anti-friction bearing assemblage having opposing raceways in spaced relation to each other and supported exclusively by one of said body and wheel members in such a manner as to be relieved of the vehicle load, the raceways therein being in electrically conductive relation with the hub of said wheel and in electrically insulated relation with said axle and said wheel being removable from its axle without disturbing the spaced relation between said raceways of said anti-friction bearing, a driving element carried by one of the wheel and frame members, separably but positively united to one of the raceways of the loadless bearing and an insulated conductor in electrically conductive relation with one of the raceways of the loadless bearing.

5. In a current-conducting assemblage for vehicles, the combination with a supporting frame, a main axle carried thereby, a wheel hub supported on said axle, a demountable wheel equipped with a pneumatic tire, of a main load-carrying anti-friction bearing immediately surrounding said axle, a supplemental, substantially loadless, anti-friction bearing assemblage supported by one of said frame and hub members in such a manner as to be relieved of the vehicle load and electrically insulated therefrom, said latter bearing having associated opposed raceways, one of which is rotatable and having rolling elements mounted therebetween, the innermost raceway enveloping said axle and being of a diameter substantially greater than the latter, a driving member supported by and electrically insulated from one of said frame and hub members and positively but separably connected to the rotatable raceway so as to drive the same without permitting relative slippage therebetween upon rotation of said hub, an electrically insulated conductor in conductive relation with one of said raceways of the loadless bearing and in insulated relation to the axle and frame and a second conductor in electrically conductive relation with said driving member and also in electrically insulated relation with said axle and hub.

6. In a current-conducting assemblage for vehicles, the combination with a supporting frame, a main axle carried thereby, a wheel hub supported on said axle, a demountable wheel mounted on said hub and equipped with a pneumatic tire, of a main load-carrying anti-friction bearing immediately enveloping said axle, a supplemental, substantially loadless, anti-friction bearing assemblage supported by one of said frame and hub members in such a manner as to be relieved of the vehicle load and electrically insulated therefrom, said latter bearing having associated opposed raceways, one of which is rotatable, and having interposed rolling elements mounted therebetween, the minimum internal diameter of either of said raceways being substantially greater than the external diameter of the axle, an elastic driving member, supported by and electrically insulated from one of said hub and frame members, separably united to and arranged to positively drive the rotatable raceway upon rotation of said hub without permitting relative slippage therebetween, an electrically insulated conductor in conductive relation with one of said raceways of the loadless bearing and in insulated relation to said axle and frame and a second conductor, in electrically conductive relation with said elastic driving member and in insulated relation with said axle and hub, whereby the gap between the wheel and the vehicle frame can be effectively electrically bridged with a minimum of frictional wear and the said wheel may be removed from said hub without disturbing the assembly of the raceways of the loadless bearing.

7. In a current-conducting assemblage, the sub-combination comprising a supporting frame, a main axle carried thereby and a wheel hub supported on said axle, a demountable wheel mounted on said hub and equipped with a pneumatic tire, a main vehicle load-carrying, anti-friction bearing assemblage immediately surrounding said axle, a supplemental anti-friction bearing assemblage having associated opposed raceways, one of which is fixedly mounted and one of which is rotatable, the minimum internal diameter of either raceway being considerably greater than the external diameter of said axle, a driving member supported by and electrically insulated from one of said hubs and frame members and arranged to positively engage and drive the rotatable raceway upon rotation of the hub when said wheel is mounted thereon, said driving member being in conductive relation with said movable raceway, and separate insulated electrical conductors respectively connected to said driving member and to the fixedly mounted raceway of the loadless bearing.

LYNOTT B. ROOT.